G. W. WALKER.
Stove Grate.
No. 34,536. Patented Feb. 25, 1862.
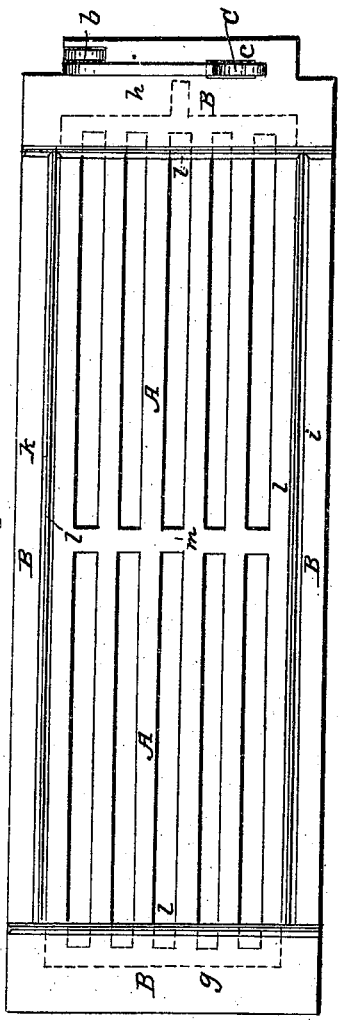
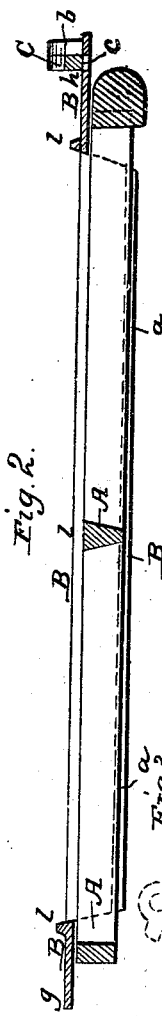
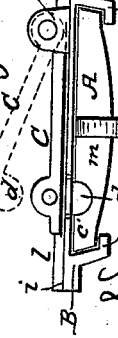

UNITED STATES PATENT OFFICE.

GEORGE W. WALKER, OF BOSTON, MASSACHUSETTS.

IMPROVEMENT IN SLIDING GRATES.

Specification forming part of Letters Patent No. 34,536, dated February 25, 1862.

*To all whom it may concern:*

Be it known that I, GEORGE W. WALKER, a citizen of the United States of America, and a resident of Boston, in the county of Suffolk and State of Massachusetts, have made a new and useful invention or Improvement having reference to Sliding Grates for Cooking-Ranges; and I do hereby declare the same to be fully described in the following specification, and illustrated in the accompanying drawings, of which—

Figure 1 is a top view, Fig. 2 a longitudinal section, Fig. 3 a front elevation, and Fig. 4 a transverse section, of the sliding grate and its supporting-frame or ways as provided with my invention, the nature of which consists in the arrangement and combination of a movable dog or abutment with the sliding grate and its supporting-frame or ways.

The object of the movable dog is not only to enable the grate while being drawn forward during the act of shaking it quickly or imparting to it sudden rectilinear movements back and forth for the purpose of separating ashes from coal while on such plate to be brought up against a stationary stop, but to be capable at other times of being either drawn entirely out of its frame or introduced into the same.

In the drawings, A is the grate, while B is its supporting-frame, the latter being provided with parallel grooves or ways $a\ a$ for reception of the grate, which slides on them and within the frame as a common drawer does into its frame or case. The grate has a rectangular form. In front of it and through the frame B and near to front end is a short post or ear $b$, which is elevated on the upper surface of the frame and has the dog or stop C hinged to it and so as to be capable of being turned down through an opening $c$ of the frame and raised up into the position, as shown in dotted lines in Fig. 3. This dog I make with a projection $d$ to extend below the front part of the frame B sufficiently for the grate to impinge against such projection $d$ while the grate may be in the act of being drawn forward under the frame, the opening $c$ being arranged at such a distance in front of the grate as will permit the grate to have the requisite longitudinal movements imparted to it, in order to divest it of ashes. Thus it will be seen that the dog constitutes a stop or abutment to suddenly arrest the grate while the latter may be in the act of being pulled forward. By elevating the dog out of the opening $c$ the grate may be drawn entirely out of the ways of the frame and be separated from the latter.

It is intended that the fire-brick or fire-proof lining of the fire-place when made above the grate shall rest on the upper surface of the frame B or those parts thereof marked $g\ h\ i\ k$. Each of those parts on its inner edge I provide with a lip $l$ to project upward from it and so as to cover the joint which would be made between the fire-proof lining and the surface supporting it. This lip will prevent coals from being driven into the joint so as to either loosen or break the lining or its cement, and especially when the grate is constructed with one or more cross-bars or connections, (shown at $m\ m$,) and besides the lips operate greatly to strengthen the frame.

I would also remark that with the dog C applied to the grate-frame and arranged with respect to the grate, as represented, the discharge of the ashes from coals while on the grate may be effected to better advantage than were the frame unprovided with any such device, because the dog constitutes a means not only of limiting the movement of the grate while being drawn forward, but of so suddenly arresting it as to cause the ashes to be thrown by their momentum out of the coals.

Having described my invention, what I claim and desire to secure by Letters Patent, is—

The arrangement and combination of the movable dog C, with the sliding grate A and its supporting-frame B, the whole being to operate together as specified.

GEO. W. WALKER.

Witnesses:
 R. H. EDDY,
 F. P. HALE, Jr.